UNITED STATES PATENT OFFICE.

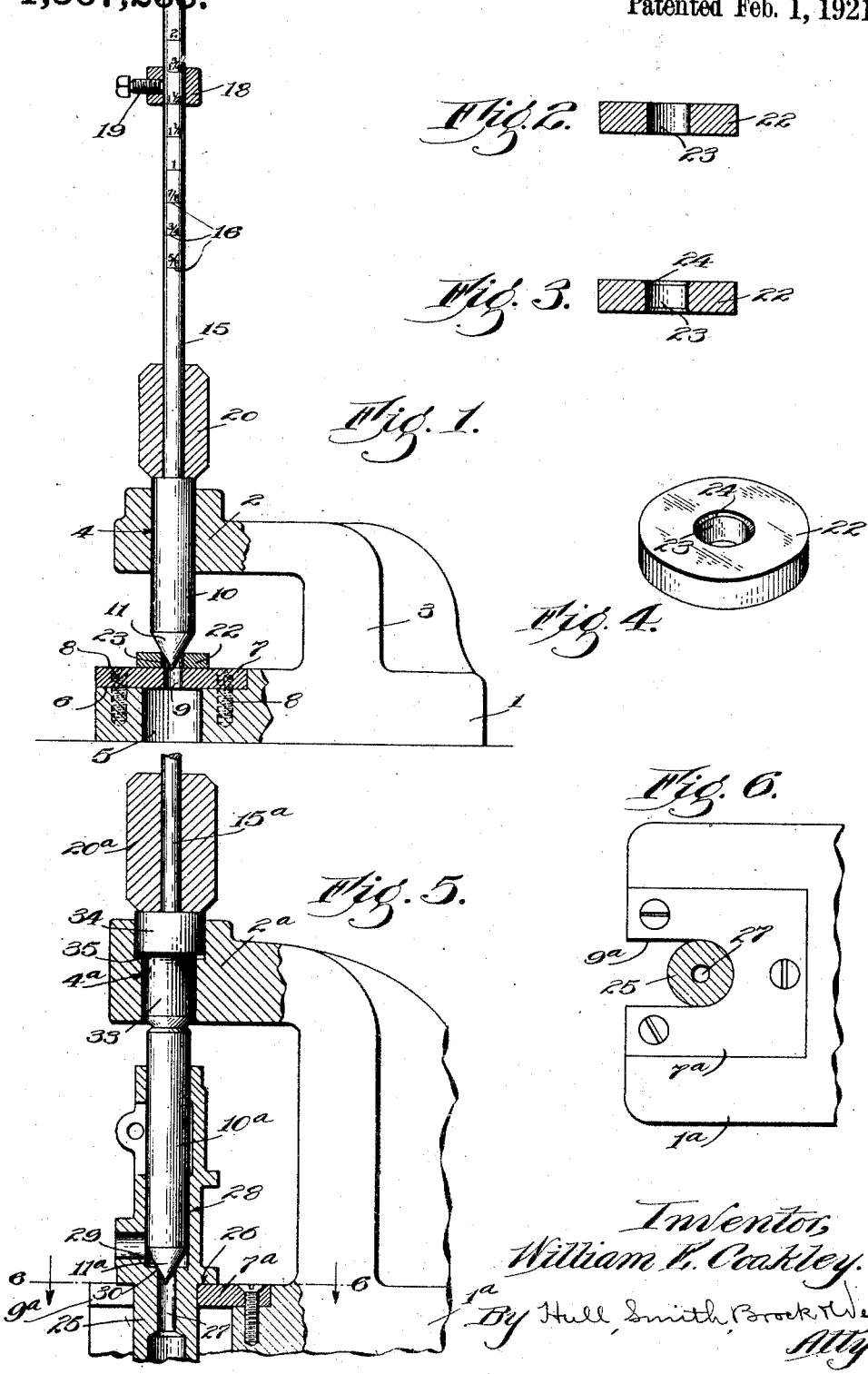

WILLIAM E. COAKLEY, OF CLEVELAND, OHIO, ASSIGNOR TO THE OHIO BODY & BLOWER COMPANY, OF CLEVELAND, OHIO, A CORPORATION OF OHIO.

APPARATUS FOR FORMING VALVE-SEATS.

1,367,238.   Specification of Letters Patent.   Patented Feb. 1, 1921.

Application filed December 7, 1917. Serial No. 206,093.

*To all whom it may concern:*

Be it known that I, WILLIAM E. COAKLEY, a citizen of the United States, residing at Cleveland, in the county of Cuyahoga and State of Ohio, have invented certain new and useful Improvements in Apparatus for Forming Valve-Seats, of which the following is a full, clear, and exact description, reference being had to the accompanying drawings.

This invention relates to apparatus for forming valve seats.

Heretofore, valve seats of the nature produced by my improved apparatus have been formed by grinding or cutting away the metal and this has necessitated the use of a lathe, requiring great care in "setting up" the work, an operation incident to the use of machines of this class. Furthermore, equal care had to be exercised in grinding or cutting the seat smoothly and to the proper depth and degree of taper. Such practice, involving so much labor and skill, obviously made the production of valve seats slow and expensive.

My invention comprehends means for producing valve seats by swaging the material surrounding an aperture in the member that is to have the valve seat thus, preferably by a single blow, to impart the desired size and shape to the seat, the swaging operation further having the effect of compressing and consequently hardening the material in the immediate region of the seat, thereby enhancing its wearing qualities. Furthermore, by this means, the surface of the seat may be made as smooth as the surface of the swage itself (within the limitations of the quality of material wherein the seat is formed), and the swage of course may be given a highly finished working surface.

Other objects of the invention are to provide comparatively simple apparatus of this character through which valve seats may be rapidly and economically produced by unskilled workmen; which is convenient of operation, and which is readily adjustable to adapt it to the production of valve seats of various diameters. A further object comprehended by my invention and realized through one of the present embodiments is the provision of a swaging tool which serves not only to form the seat, but to properly locate in the machine the member wherein the seat is to be formed.

The foregoing objects, and others which will become apparent as this description proceeds, are attained in the constructions illustrated in the accompanying drawing wherein Figure 1 is a side elevation of a machine embodying my invention; Fig. 2 is a sectional detail of a blank member wherein valve seats are adapted to be formed by the machine illustrated in Fig. 1; Fig. 3 is a similar view of the member after the valve seats have been formed therein; Fig. 4 is a perspective view of the same; Fig. 5 is a view, similar to Fig. 1, of a modified form of the machine, and Fig. 6 is a sectional plan immediately above the work support of Fig. 5, as indicated by the line 6—6.

The form of machine shown in Fig. 1 comprises a base 1 and a head 2, the latter being supported a suitable distance above the base by a neck 3. The head overhangs the front portion of the base and has a bore 4 in vertical alinement with a hole 5 of the base. A depression 6 is formed in the top of the base at the front, and in it is fastened a hardened plate 7 as by screws 8, the plate having an aperture 9 that opens into the hole 5. A swage 10 is guided within the bore 4, and its lower end 11 is shown as conical and as possessing the same degree of taper as that to be given the valve seat.

A guide 15, consisting of a rod, rises from and is carried by the swage 10, and this rod is graduated as indicated at 16 whereby the location of an adjustable collar 18 may be determined as hereinafter explained. The collar is held to the rod by a set screw 19. A weight 20 is slidable freely upon the rod 15 between the upper end of the swage and the collar 18.

In the use of the present form of my invention, the operator grasps the rod 15 and lifts the swage 10 high enough to permit a member or element 22, wherein the valve seat is to be formed, to be placed upon the plate 7 with its aperture 23 approximately in register with the opening 9 of the plate 7. He then lowers the swage so that its tapered end may enter the aperture of the member and accurately center or position it with respect to the swage. Leaving the swage in this position, the operator elevates the weight 20 until it attains the height of the collar 18, when he allows it to drop and impose a blow upon the upper end of the swage 10 with the result that the seat is formed within the upper end of the aperture of the member 22, the seat being indicated, in Figs. 3 and 4, at 24. He then elevates the swage as before, inverts the member 22, lowers the swage into contact with the member, and then elevates and drops the weight to form a valve seat at the opposite end of the aperture.

There is a rather important relation existing between the heft of the weight—plus that of the swage, rod and collar—and the height to which the weight is elevated before it is released, which determines the power of the blow that is imparted to the element or member 22, and this relation may be altered through the adjustment of the collar 18 to vary the power of the blow according to the size of valve seat that is to be formed. It is clear that a valve seat of comparatively small diameter would require a lighter blow than one of considerably greater diameter, for in the latter instance there would be much more metal to displace than in the former. The graduations 16 upon the rod 15 indicate the positions which the collar 18 should occupy when the machine is adjusted to operate upon members having (in the present instance) external diameters indicated by the respective graduations.

It may be explained that the elements or members 22 constitute reversible valve seats that are now in quite extensive use. However my invention may be used in producing valve seats in the interiors of valve casings by modifying the machine as illustrated in Fig. 5. Here a plate 7ª is set within the base 1ª and is provided with a notch 9ª into which a piece of work 25 may be inserted, the work, in the present case, consisting of a casing having a flange 26 which rests upon the portion of the plate 7ª surrounding the notch 9ª. The casing is further provided with bores 27 and 28 of different diameters between which a shoulder 29 is formed, it being designed to have a valve seat 30 formed within the end of the bore 27 adjacent the shoulder 29.

10ª is a swage that is adapted to be dropped into the bore 28 of the piece of work before the latter is placed in the machine, the lower conical end 11ª of the swage projecting into the bore 27. As the flange 26 is slid in upon the plate 7ª, the upper end of the swage engages the inclined edge portion of the lower end of a hammer 33 that is guided within the bore 4ª of the head 2ª, elevating the hammer slightly and supporting it with its enlarged upper end 34 off a shoulder 35 that is formed by the enlargement of the upper end of the bore 4ª. A guide 15ª is carried by the hammer 35 and a weight 20ª is reciprocable thereon so that by raising the weight as in the former case and allowing it to drop, it will impart a blow, through the hammer 33, to the swage 10ª of sufficient power to produce the valve seat 30.

Having thus described my invention what I claim is:—

1. In apparatus for forming valve seats, the combination of a work support, a swage having a forming surface corresponding in shape to the seat engaging surface of the valve wherewith the seat is designed for use, the swage being arranged to engage a piece of work on the support, and means for imparting a blow to the swage thereby to deform the work and impose upon it the shape of the forming surface of the swage.

2. In apparatus for forming valve seats, the combination of a work support, a swage arranged to engage a piece of work on the support, a guide carried by the swage, and a weight slidable along the guide.

3. In a machine for forming valve seats, the combination of a base, a head supported above the base, a swage sustained by the head and movable toward and from the base, a guide carried by the swage, and a weight slidable along the guide.

4. In a machine for forming valve seats, the combination of a base, a head supported thereabove, a blow imparting member sustained by the head, a guide carried by said member, and a weight slidable along the guide and adapted when dropped to impart a blow of given power to the member.

5. In apparatus for forming valve seats, the combination of a work support, a blow imparting member arranged in operative relation to a piece of work on said support, a weight, a guide for directing the weight into operative engagement with the member, and a stop adjustable along the guide for limiting the movement of the weight, the guide having graduations indicating predetermined adjustments of the stop.

6. In apparatus for forming valve seats in apertured members, the combination of a support for said member, a swage having a tapered portion which corresponds in shape to the seat engaging portion of the valve wherewith the seat is designed for use, the swage being arranged to be placed with its tapered portion within the aperture of the member, and means for imparting a blow of given power to the swage.

7. In apparatus for forming valve seats in apertured members, the combination of a support for said member, a swage having a tapered portion which corresponds in shape to the seat engaging portion of the valve wherewith the seat is designed for use, the swage being arranged to be placed with its tapered portion within the aperture of the member, and a weight of given heft arranged to be dropped from a given height upon the swage for imposing a blow of given power thereon.

In testimony whereof I hereunto affix my signature.

WILLIAM E. COAKLEY.